United States Patent [19]

Gysi

[11] Patent Number: 4,870,241
[45] Date of Patent: Sep. 26, 1989

[54] CONVEYOR DEVICE FOR CAN BODIES IN A CAN WELDING MACHINE

[75] Inventor: Peter Gysi, Bellikon, Switzerland

[73] Assignee: Elpatronic AG, Zug, Switzerland

[21] Appl. No.: 173,279

[22] Filed: Mar. 25, 1988

[30] Foreign Application Priority Data

May 7, 1987 [CH] Switzerland .................. 01737/87

[51] Int. Cl.[4] .............................................. B23K 27/00
[52] U.S. Cl. ........................................ 219/64; 219/79; 413/71; 228/17.5; 198/627; 198/725; 198/817
[58] Field of Search ............... 219/64, 79, 81; 413/71, 413/72, 77; 228/17.5; 198/604, 627, 725, 817, 726

[56] References Cited

U.S. PATENT DOCUMENTS

| 2,432,490 | 12/1947 | Seltzer | 198/726 X |
|---|---|---|---|
| 3,584,178 | 6/1971 | Huber et al. | 219/59 |
| 4,287,983 | 9/1981 | Bronsveld | 198/817 |
| 4,497,995 | 2/1985 | Nilsen | 219/121 LC |
| 4,543,150 | 9/1985 | Marchetti | 198/627 X |
| 4,574,176 | 3/1986 | Sharp | 219/121 LD |
| 4,656,949 | 4/1987 | Ragot | 198/726 X |
| 4,694,953 | 9/1987 | Murphy et al. | 198/627 |

FOREIGN PATENT DOCUMENTS

621499 2/1981 Switzerland .

Primary Examiner—A. D. Pellinen
Assistant Examiner—David Osborn
Attorney, Agent, or Firm—McCormick, Paulding & Huber

[57] ABSTRACT

Can bodies (1) rounded around an arm (16) are taken over by endless conveying tracks (30;50). These are each guided over guide devices (32;52) and a drive wheel (33;53) and each comprise a run parallel to the arm (16) in order to convey the can bodies (1) along the arm (16) in the direction of a welding station (70). The guide devices (32;52) are mounted on track carriers (26;46) and form, together with these and the associated conveying track (30;50), units adapted to the length of the can bodies and interchangeable as a whole. These units are each secured to a sliding carriage (22;42) which is adjustable at least substantially radially to the arm (16). Track carriers (26;46) provided for different ranges of can length can be exchanged for one another with a few movements of the hand and each track carrier (26;46) can be adjusted by the associated sliding carriage (22;42) in such a manner that its arrangement is adapted in an optimum manner to can bodies (1) of any desired diameter within the working range of the machine.

9 Claims, 9 Drawing Sheets

CONVEYOR DEVICE FOR CAN BODIES IN A CAN WELDING MACHINE

BACKGROUND OF THE INVENTION

The invention relates to a conveyor device for can bodies in a can welding machine having an arm around which the can bodies are rounded and at least one endless conveying track which is guided over guide devices and a driving wheel and comprises a run parallel to the arm in order to convey the can bodies along the arm in the direction of a welding station.

In a known can welding machine which is equipped with such a conveyor device (CH-PS 621 499), a bearer is disposed above the arm and parallel thereto, the lower marginal region of which bearer is constructed in the form of a Z-rail to guide the longitudinal edges of the can bodies. Disposed one at each side of the bearer is a conveying track which consists of an endless flat-link chain with pusher dogs disposed spaced apart. The two flat-link chains each run in a vertical plane which extends parallel to the common central plane of the arm and of the bearer. The lower run of each of these two conveying tracks runs immediately beside the Z-rail in such a manner that the pusher dogs of the two conveying tracks can engage in pairs behind the rear edge of each can body regardless of whether this has a large or a small diameter. These two conveying tracks each have a rear and a front guide roller; the front guide rollers are disposed in the vicinity of a welding station in which the longitudinal seams of the can bodies are welded together by means of a pair of electrode rollers. In the region of the rear guide rollers, the said conveying tracks overlap a pair of preceding conveying tracks, each of which likewise consists of a roller chain and pusher dogs arranged spaced apart and which take over the can bodies from a rounding apparatus. These preceding conveying tracks are each disposed at one side of the said arm in an inclined plane which is substantially radial with respect to the arm. The pusher dogs of these two preceding conveying tracks extend so far away from the associated conveyor chain in each case that they are capable of pushing forwards can bodies of different diameters by engaging behind their rear edge.

In similar conveyor devices on can welding machines, it is also known (US-PS 4 497 995 and US-PS 4 574 176) to mount guide rollers and tension rollers, round which an endless conveying track is wrapped in the form of a chain equipped with pusher dogs, on a stationary mounting plate which comprises a plurality of sets of holes so that the said rollers can be disposed at different distances away from a Z-rail and the position of the whole conveyor track can be adapted to can bodies of different diameters as a result.

In all known conveyor devices which belong to the type described at the beginning or are comparable therewith, the range within which an adaptation to can bodies of different diameter or different length is possible with little expenditure on labour, is comparatively narrowly limited. If conversions are possible at all within a larger range of diameters or lengths of the can bodies, they require a time-consuming conversion of large parts of the can welding machine.

It is therefore the object of the invention to develop further a conveyor device for can bodies on a can welding machine in such a manner that it can be adapted with little effort to can bodies within a large range of diameters and lengths.

Starting from a conveyor device of the type described at the beginning, the problem is solved, according to the invention in that the guide devices are mounted on a track carrier and form with this and with the associated conveying track, a unit adapted to the length of the can bodies and this unit as a whole is interchangeably secured to a sliding carriage which is adjustable at least substantially radially to the arm.

As a result, the possibility is afforded of dividing a multiplicity of can bodies of different lengths, which are to be welded on a can welding machine, into a plurality of ranges of length with each of which there is associated at least one unit consisting of track carrier, conveying track and associated guide devices. The track carriers provided for different ranges of can length can be exchanged for one another with a few movements of the hand and each track carrier can be adjusted by the associated sliding carriage in such a manner that its arrangement is adapted in the optimum manner to can bodies of any desired diameter within the working range of the machine. There is also the possibility of retrofitting a machine which was originally equipped with track carrier units of simple construction, with more highly developed track carrier units, for example with those which have electronically controlled individual drives.

If at least one pair of endless conveying tracks is provided in the conveyor device according to the invention, which act jointly and simultaneously on the can bodies, then it is advisable for each conveying track to have associated with it, its own track carrier and its own sliding carriage and the two sliding carriages of each pair to be adjustable on guides which extend one at each side of a longitudinal median plane of the arm, obliquely upwards in the direction of this.

This saddle-like arrangement of the guides below the arm, improves the accessibility of the can bodies which are being conveyed along the arm. The possibility of moving the conveying tracks radially away from the arm by means of the sliding carriages to which the track carriers are secured, also facilitates the mounting and removal of the track carriers together with all the associated components It is further an advantage if guide elements for the can bodies are adjustably secured to one of the sliding carriages. Thus the additional advantage is achieved that the said guide elements, together with the sliding carriage on which they are supported, can be adjusted away from the arm as a result of which this becomes accessible all round. Accordingly, operational disturbances, during which can bodies have piled up on the way to the welding station, can be eliminated particularly easily and quickly.

Preferably, the two sliding carriages of each pair of sliding carriages each have their own adjusting drive associated with them for a precise adjustment according to the diameter of the can bodies and at least one of the two sliding carriages of each pair of sliding carriages, which is disposed at a side of the can welding machine easily accessible to an operator has associated with it a rapid-motion drive which can be actuated independently of its adjusting drive, to expose the arm. The rapid-motion drive likewise contributes to accelerating the conversion of the machine and the elimination of operational disturbances.

It is further an advantage if each track carrier is mounted on a transmission unit which is secured to the associated sliding carriage and which comprises a driving shaft which can be coupled to the driving wheel If the conveying tracks are arranged in pairs in the manner described, it is further advantageous for the driving shafts on the two sliding carriages each to be able to be driven through a cardan shaft from a common motor.

SUMMARY OF THE INVENTION

As in the known conveyor devices described, so in the conveyor device according to the invention, each endless conveying track which conveys the can bodies to the welding station may be preceded by a conveying track which takes the can bodies over from a rounding station. In this case it is an advantage if each preceding conveying track is a component of a unit which is interchangeably mounted on a sliding carriage and adapted to the size of the can bodies, in a corresponding manner to the following conveying track conveying the can bodies to the welding station.

In this case, it is further an advantage if associated with each preceding conveying track there is a transmission which is connected to the transmission for the following conveying track by a cardan shaft.

BRIEF DESCRIPTION OF THE DRAWINGS

One example of embodiment of the invention is described below, with further details, with reference to diagrammatic drawings.

DETAILED DESCRIPTION OF THE PREFERRED EMBODIMENTS

The purpose of the machine illustrated is to round can bodies 1 from plane rectangular sheet-metal blanks and to weld their longitudinal edges together.

The machine has an elongated machine bed 3 which is bounded at its ends by end walls 4 and which is divided by partitions 5. Secured to the machine frame 3 is a gantry-like frame 6 which is elongated in the same direction and on which hinged covers 7 are articulated. A switch box 8 is connected to an end region of the frame 6 at its side remote from the machine bed 3. A housing 9 is connected to the other end region, at the same side.

Disposed on the housing 9 is a destacker 10 which is adapted, in the usual manner, to remove plane sheet-metal blanks individually from a stack and convey them to a flexer 11 which frees each individual sheet-metal blank of internal stresses by multiple bending and supplies it to a rounding station 12.

At the transition between flexer 11 and rounding station 12 there is disposed a wedge 13 over which each individual sheet-metal blank runs in between a lower roll 14 and an upper roll 15. The lower roll 14 is mounted on an arm 16 which is secured by one of its ends to the frame 6 and extends from there horizontally beyond the rounding station 12 along a large portion of the frame 6, at about half its height. The upper roll 15 is mounted on a bracket 17 which extends above the arm 16, transversely to this and is secured, by one of its ends, to the frame 6.

The rounding station 12 further includes a shell-like lower guide element 18 and two upper guide elements 19 which are likewise shell-like and each of which has a cross-section in the form of a sector of a ring and all of which are arranged round the arm 16 in such a manner that each individual sheet-metal blank is conveyed by the rolls 14 and 15 into a gap between these guide elements and the arm 16 and in the course of this assumes the desired cylindrical shape of a can body 1.

Below, the conveyor device whereby the can bodies 1 are conveyed individually away from the rounding station 12 along the arm 16 will be described above all.

Figure 1:
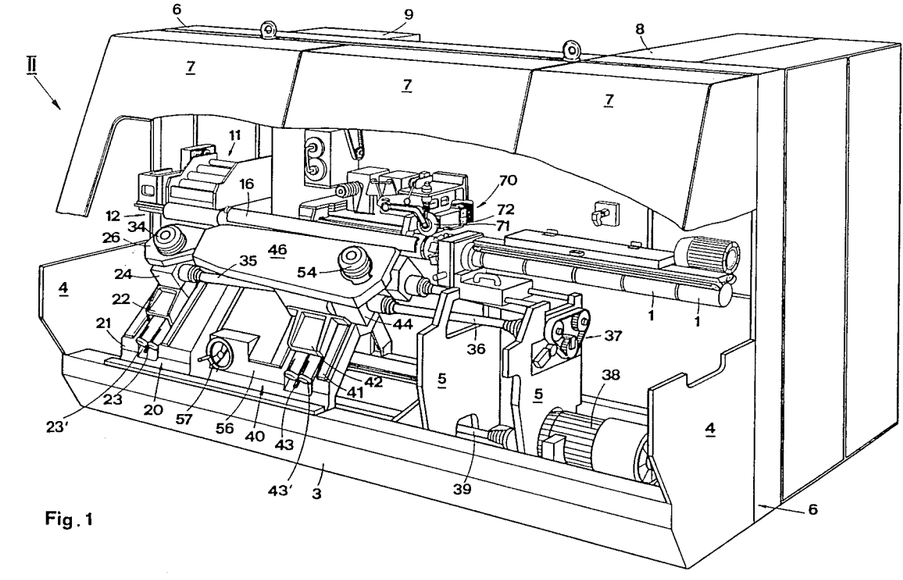
FIG. 1 shows a perspective general view of a can welding machine with a conveyor device according to the invention.
Figure 2:
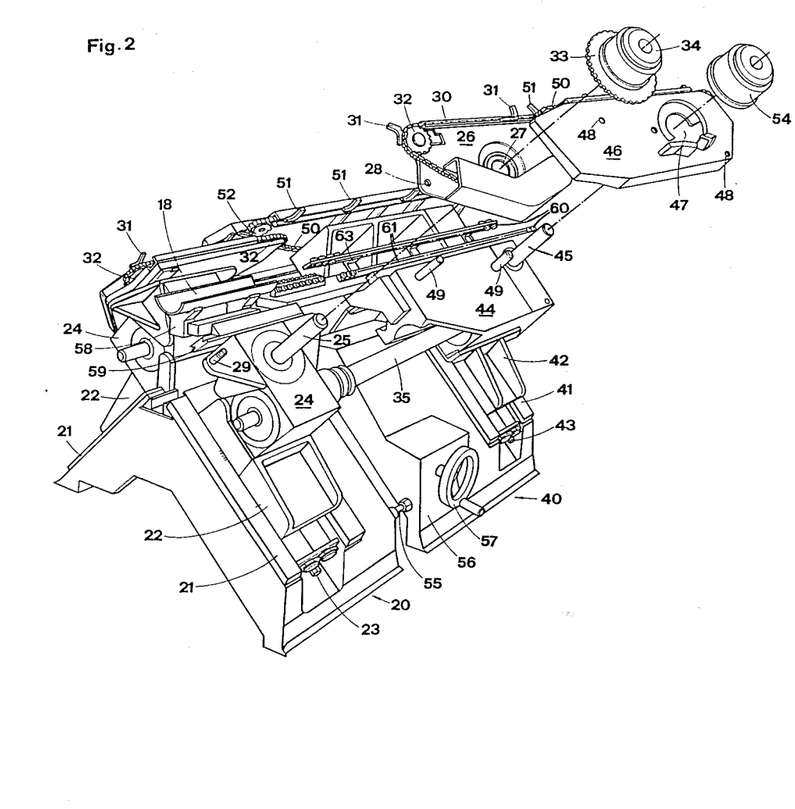
FIG. 2 shows an oblique view in the direction of the arrow II in FIG. 1 of structural components of the machine in a partially dismantled state.
Figure 3:
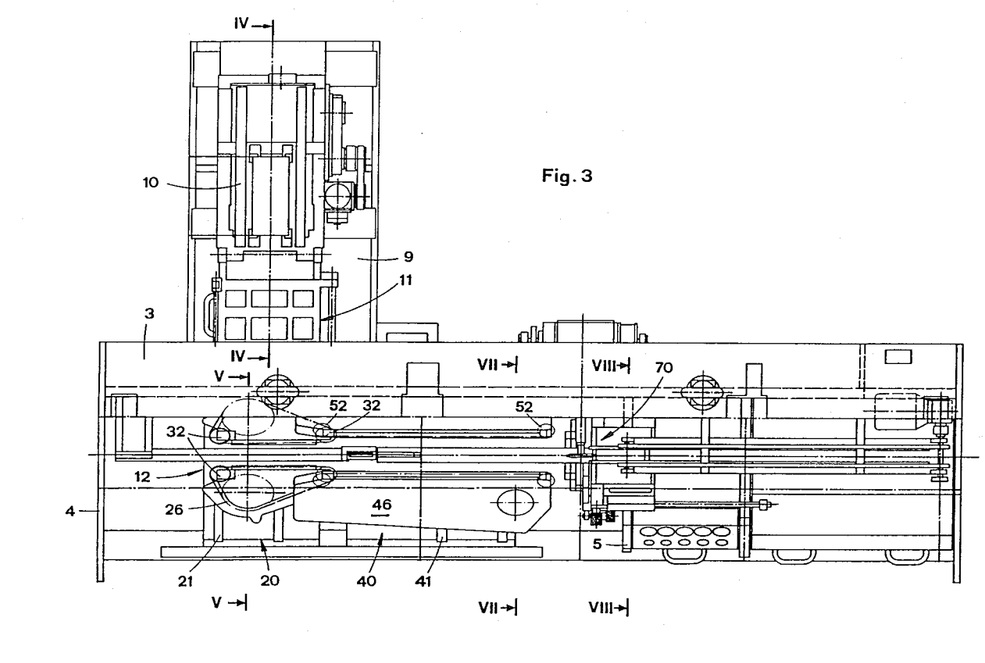
FIG. 3 shows the plan view of the machine.
Figure 4:
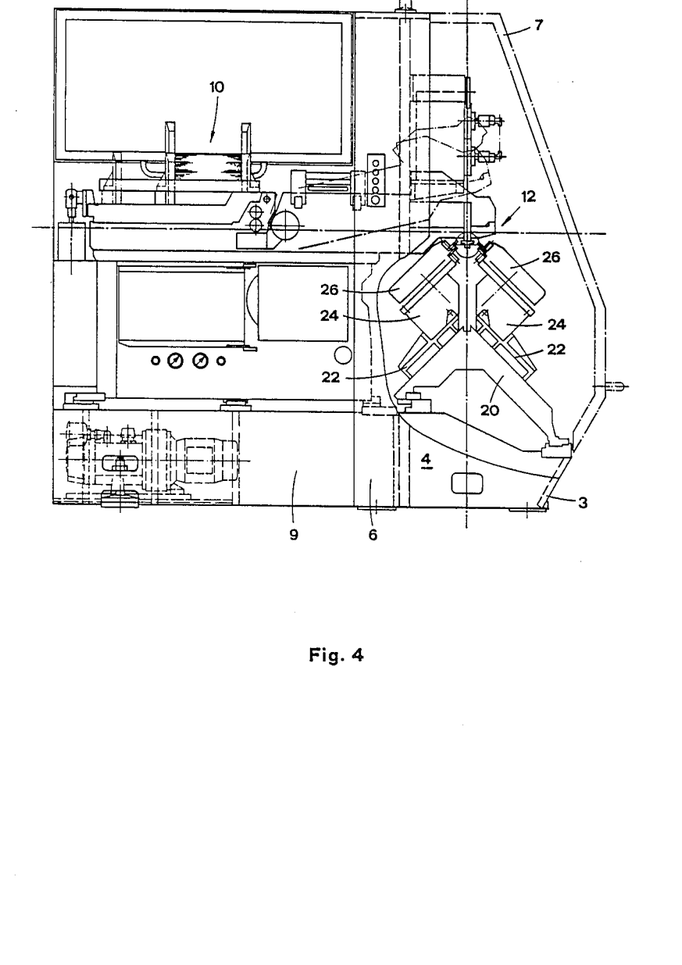
FIG. 4 shows the side view in the direction of the arrow IV in FIG. 3.

Below the rounding station 12, the machine bed 3 is bridged by a frame 20 which is similar in shape to a gable roof with an open ridge. Disposed on the frame 20 are two guides 21 which extend upwards, one at each oblique side of the frame, at right angles to one another, radially towards the arm 16 which are each inclined at 45° to a horizontal plane. A sliding carriage 22 is guided on each of the guides 21 and is adjustable with great accuracy by means of an adjusting drive 23 which may comprise a threaded spindle, for adaptation to can bodies 1 of different diameter. That one of the two sliding carriages 22 which is disposed at the tending side of the machine, that is to say which is adjacent to the observer of FIG. 1, can also be adjusted independently of the adjusting drive 23 by means of a rapid-motion drive 23' so that the arm 16 can be exposed quickly if a disturbance has to be eliminated for example.

Each of the sliding carriages 22 carries a transmission unit out of which a driving shaft 25 projects upwards. The driving shafts 25 lie in a common vertical plane which lies transversely with respect to the arm 16 and each forms an angle of 45° with the vertical longitudinal median plane of the arm 16.

Secured to the transmission unit 24 of each of the two sliding carriages 22 is an interchangeable track carrier 26 which has a certain similarity to the chain blade of a chain saw. Each track carrier 26 has an aperture 27 for the associated driving shaft 25 and also has a pair of centering holes 28 which are situated substantially diametrically opposite one another in relation to the aperture 27 and each of which is associated with a bolt 29 disposed on the casing of the associated transmission unit 24. Each track carrier 26 is mounted on the associated bolt 29, centered by this and secured by threaded nuts, not illustrated, which can be undone rapidly.

Guided on each of the track carriers 26 is an endless conveying track 30 which, in the example illustrated, is formed by a flat-link chain with pusher dogs 31 disposed with uniform spacing but could also be formed by a toothed belt for example. Each conveying track 30 runs over a pair of guide devices 32, each of which comprises a chain wheel in the example illustrated. The guide devices 32 are arranged in such a manner that one run of each conveying track 30 extends parallel to the arm 16 and the conveying track as a whole is always kept uniformly tensioned. Further associated with each conveying track 30 is a drive wheel 33, likewise a chain wheel in the example illustrated, which can be placed on the associated driving shaft 25 and secured to this by means of a coupling 34 which can be released rapidly.

The driving shafts 25 of the two sliding carriages 22 are each connected, through the associated transmission unit 24, to a cardan shaft 35 and via this to a further cardan shaft 36. The two cardan shafts 36 originate from a branching transmission unit 37 which is secured to one of the partitions 5 and can be driven by a motor 38.

The flexer 11 and the rolls 14 and 15 in the rounding station 12 are further driven by the motor 38 via a cardan shaft 39. These conveying elements which are responsible for supplying the sheet-metal blanks to the rounding station 12 are therefore synchronised with the conveying tracks 30 In this manner, care is taken to ensure that each can body 11 which has been rounded round the arm 16 in the rounding station 12 is caught by two pusher dogs 31, each of which belongs to one of the two conveying tracks 30, and which move the can body along the arm 16 away from the rounding station 12.

At a distance downstream of the frame 20 in the direction of conveying, a further, similar frame 40 is mounted on the machine bed 3. The frame 40 comprises a pair of guides 41 which correspond to the guides 21 and each guide a sliding carriage 42 which is adjustable with great accuracy, by means of an adjusting drive 43 in the form of a threaded spindle, for adaptation to can bodies 1 of different diameter. That one of the two sliding carriages 42 which is disposed at the tending side of the machine, that is to say which is adjacent to the observer of FIG. 1, can also be adjusted, independently of the adjusting drive 43, by means of a rapid-motion 43', away from the arm 16 so that this can be made accessible quickly without the setting of the adjusting drive 43 being altered. The two rapid-motion drives 23' and 43' can always be actuated jointly and in the same direction.

Each of the two sliding carriages 42 carries a transmission unit 44 with a driving shaft 45. Each of the two transmission units 44 connects the two associated cardan shafts 35 and 36 to one another and to the driving shaft 45 in question. Placed on the transmission unit 44 of each of the two sliding carriages 42 is a track carrier 46 which, for this purpose, comprises an aperture 47 for the driving shaft 45 as well as a pair of holes 48 for a pair of bolts 49 secured to the transmission unit 44, and can easily be exchanged.

Each track carrier 46 carries a conveying track 50 which is again formed by a flat-link chain with pusher dogs 51. Each of the two conveying tracks 50 runs over a pair of guide devices 52 and can be driven by a drive wheel 53 which can be placed on the associated driving shaft 45 and be secured to this by means of a coupling 54 which can be released rapidly.

The frames 20 and 40 are adjustable, in the manner of lathe carriages, along the machine bed 3, that is to say parallel to the arm 16. The two frames 20 and 40 are connected to one another for joint movements, by means of a threaded rod 55 which is adjustable in length. Mounted on the frame 40 is a toothed-wheel drive 56 which can be driven by a hand wheel 57 and cooperates with a rack, not illustrated, secured to the machine bed 3 to adjust the frames 20 and 40.

The lower guide element 18 described in the rounding station 12 is secured to a support 58 which in turn is adjustably secured, by means of a clamping bar 59, to the casing of the transmission unit 24 on that one of the two sliding carriages 22 which is disposed at the tending side of the machine and is adjustable in rapid motion, as described. This carriage 22 is shown in FIG. 5b in an inoperative position removed from arm 16. Thereby the distance between the operative and inoperative position of the said carriage 22 is indicated with an arrow.

Figure 7:
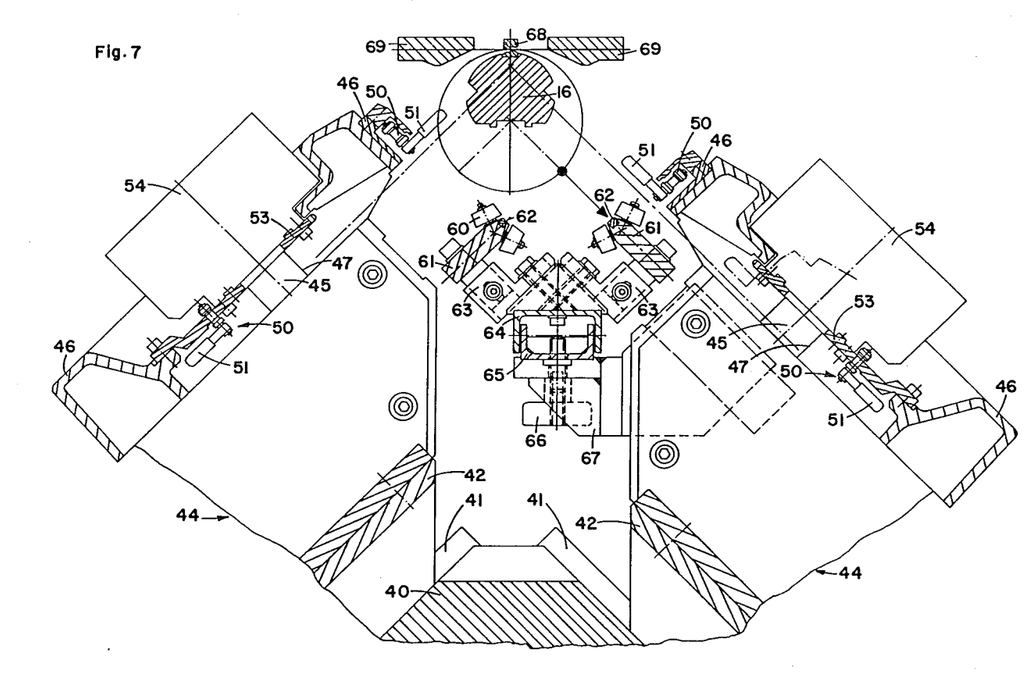
FIG. 7 shows the partial section VII—VII in FIG. 3.
Figure 8:
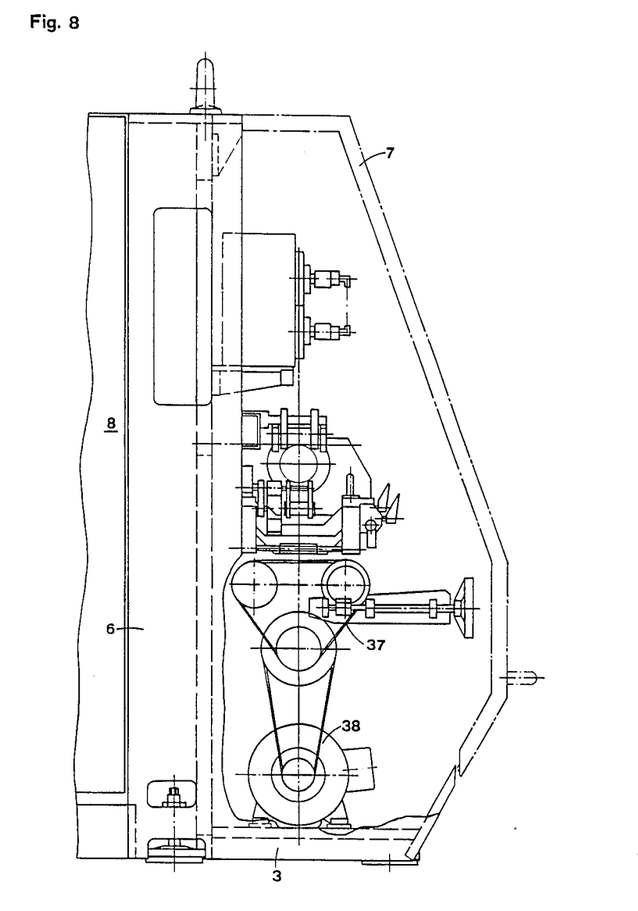
FIG. 8 shows the partial section VIII—VIII in FIG. 3.

In the region of the track carrier 46, that is to say at a distance downstream of the rounding station 12, in the conveying direction, further guide elements 60 in the form of pairs of rollers which are mounted on roller carriers 61 are disposed below the arm 16 according to FIG. 7. In addition, a magnetic bar 62 is secured to each roller carrier 61 and ensures that the can bodies 1 bear uniformly against the guide elements 60. Each roller carrier 61 is adjustably secured, through supports 63, on a U-rail 64 which is open downwards and this in turn is held on a U-rail 65 which is open upwards and which in turn is clamped to a bracket 67 for rapid release by means of a handle 66. Each of the brackets 67 is secured to the transmission unit 44 on that one of the two sliding carriages 42 which is disposed at the tending side of the machine and is as well adjustable in rapid motion, as described. Also this carriage 42 is shown in FIG. 7 in an inoperative position removed from arm 16. Thereby again the distance between the operative and inoperative position of the said carriage 42 is indicated with an arrow.

Within the working range of the two conveying tracks 50, a Z-rail 68 which guides the longitudinal edges of the can bodies 1 in the usual manner is secured to the top of the arm 16. Disposed parallel to the Z-rail 68 and at the same height as this is a pair of busbars 69 which supply a welding station 70 with current. The welding station 70 is of conventional construction and comprises, above all, a pair of electrode rollers 71 and 72 for welding together the longitudinal edges of the can bodies 1.

Figure 5A:
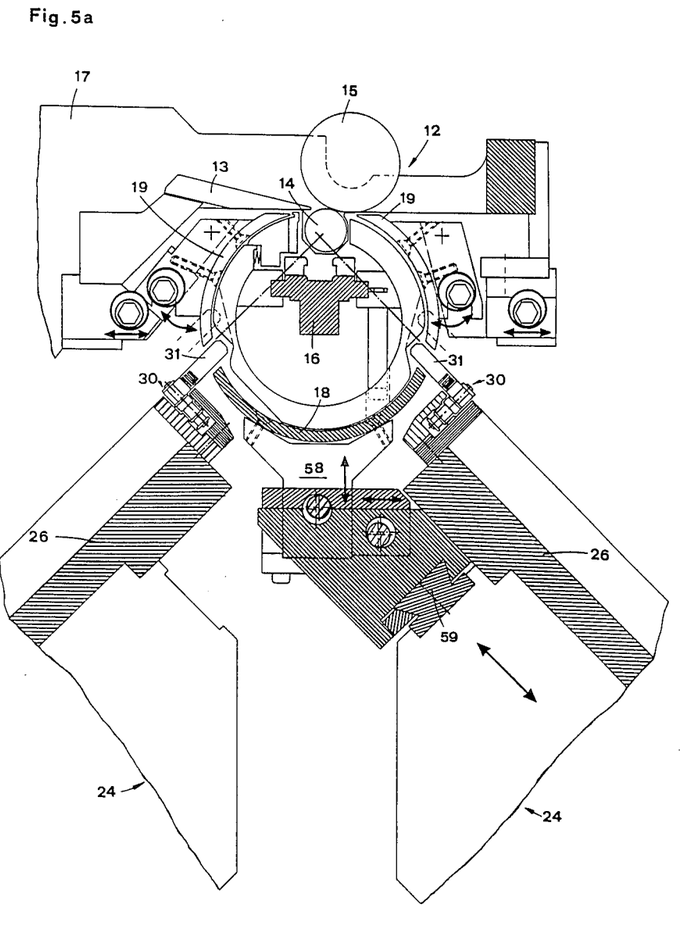
FIG. 5a shows the partial section V—V of FIG. 3 with the machine adjusted and equipped for welding large can bodies.
Figure 5B:
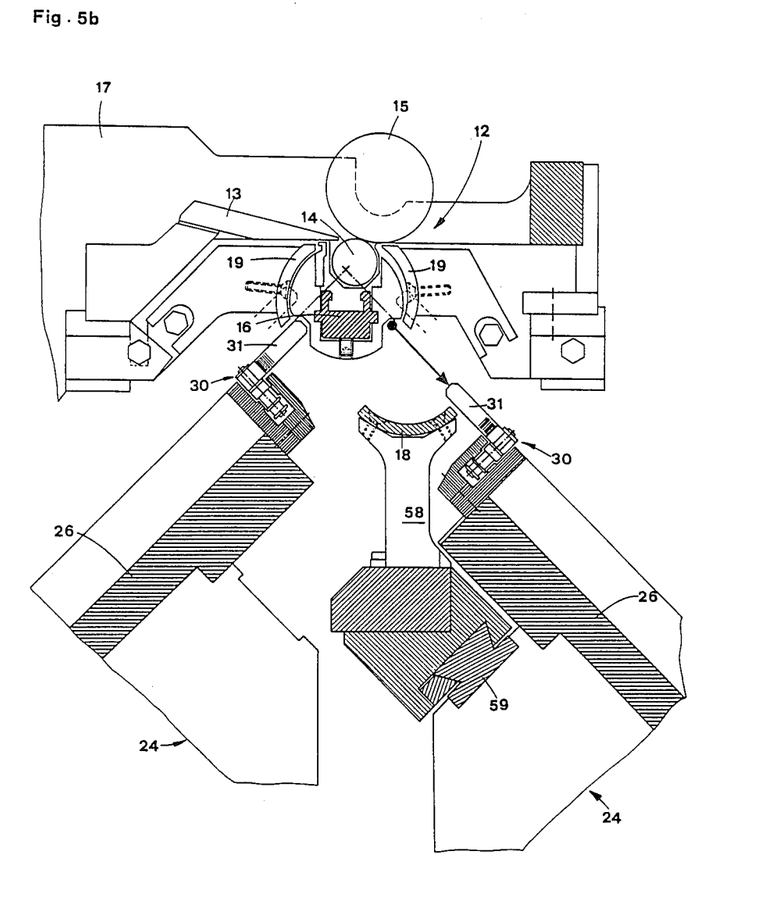
FIG. 5b shows the partial section V—V of FIG. 3 with the machine adjusted and equipped for welding small can bodies.
Figure 6:
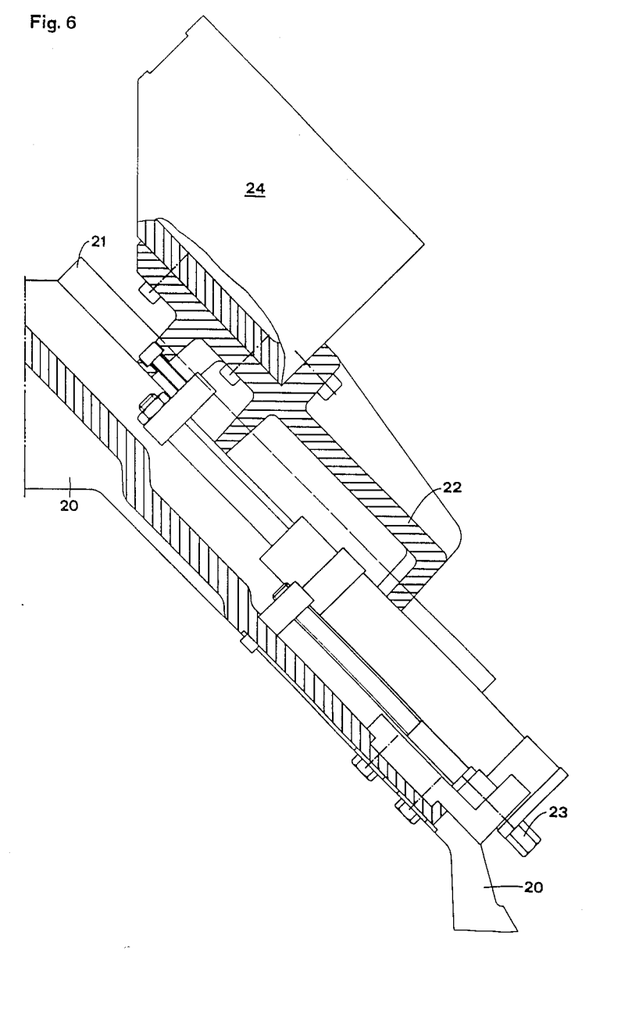
FIG. 6 shows a completed detail from FIG. 4.

If the machine equipped, according to FIG. 5a, for the production of large can bodies 1 is to be converted so that it can produce very much smaller can bodies, and if such a conversion is not possible by simply adjusting the sliding carriages 22 and 42, the track carriers 26 and 46 originally used together with their conveying tracks 30 and 50 and guide devices 32 and 52 and if necessary including the associated drive wheel 33 and 53 respectively, are replaced by track carriers 26 and 48 of appropriately different form. If necessary, the guide elements 18, 19 and 60 are also exchanged.

I claim:

1. A conveyor device for use with can bodies in a can welding machine having an arm (16) around which the can bodies (1) are rounded, said conveyor device having at least one endless conveying track (30;50) which is guided over guide devices (32;52) and a drive wheel (33;53) and comprises a run parallel to the arm (16) in order to convey the can bodies (1) along the arm (16) in the direction of a welding station (70), characterized in that:

the guide devices (32;52) are mounted on a track carrier (26;46) and form, together with the track carrier and a conveying track (30;50), a unit which is adapted to the length of the can bodies (1) and can be exchanged as a whole, and said unit being secured to a sliding carriage (22;42) which is adjustable at least substantially radially to the arm (16) and which extends obliquely toward the arm (16).

2. A conveyor device according to claim 1 having at least one pair of endless conveying tracks (50) which act jointly and simultaneously on the can bodies (1), characterized in that associated with each conveying track (30;50) is its own track carrier (26;46) and its own sliding carriage (22;42), and the two sliding carriages (22;42) of each pair are adjustable on guides (21;41) which extend obliquely upwards, one at each side of a longitudinal median plane of the arm (16), in the direction of the arm (16).

3. A conveyor device according to claim 2, characterized in that associated with both sliding carriages (22;42) of each pair of sliding carriages is its own adjusting drive (22;43) for precise adjustment according to the diameter of the can bodies (1) and a rapid-motion drive being associated with at least one of the two sliding carriages (22;42) of each pair of sliding carriages which is disposed at the side of the can welding machine accessible to an operator, said rapid-motion drive (23';43') capable of being actuated independently of its adjusting drive (23;43) to expose the arm (16).

4. A conveyor device according to claim 1, characterized in that a guide element (18;60) for the can bodies (1) is adjustable secured to the sliding carriage (22;42).

5. A conveyor device according to claim 1, characterized in that each track carrier (26;46) is placed on a transmission unit (24;44) which is secured to the associated sliding carriage (22;42) and comprises a driving shaft (25;45) which can be coupled to the drive wheel (33;53).

6. A conveyor device according to claim 5, characterized in that the driving shafts (25;45) on the sliding carriages (22;42) can each be driven through a cardan shaft (35;36) from a common motor (38).

7. A conveyor device according to claim 6, characterized in that associated with each preceding conveying track (30) is a transmission (24) which is connected to the transmission (44) for the conveying track (50) following it, by a cardan shaft (35).

8. A conveyor device according to claim 1, wherein each endless conveying track (50) which conveys the can bodies (1) to the welding station (70) is preceded by a conveying track (30) which takes over the can bodies (1) from a rounding station (12), characterized in that the preceding conveying track (30) is a component of a unit which is interchangeably mounted on a sliding carriage (42) and adapted to the length of the can bodies (1) in a corresponding manner to the conveying track (50) following it and conveying the can bodies (1) to the welding station (70).

9. A conveyor device for can bodies in a can welding machine having an arm (16) around which the can bodies (1) are rounder, said conveyor device having at least one endless conveying track (30;50) which is guided over guide devices (32;52) and a drive wheel (33;53) and comprises a run parallel to the arm (16) in order to convey the can bodies (1) along the arm (16) in the direction of a welding station (70), characterized in that:

the guides devices (32;52) are mounted on a track carrier (26;46) and form, together with the track carrier and a conveying track (30;50), a unit which is adapted to the length of the can bodies (1) and can be exchanged as a whole;

said unit being secured to a sliding carriage (22;42) which is adjustable at least substantially radially to the arm (16); and wherein each endless conveying track (50) which conveys the can bodies (1) to the welding station (70) is preceded by a conveying track (30) which takes over the can bodies (1) from a rounding station (12), characterized in that each preceding conveying track (30) is component of a unit which is interchangeably mounted on a sliding carriage (42) and adapted to the length of the can bodies (1) in a corresponding manner to the conveying track (50) following it and conveying the can bodies (1) to the welding station (70).

* * * * *